May 7, 1968  L. L. LOPER, JR., ET AL  3,382,493
UNDERGROUND PIPE INSULATION LIQUID-DETECTOR
Filed Nov. 4, 1964
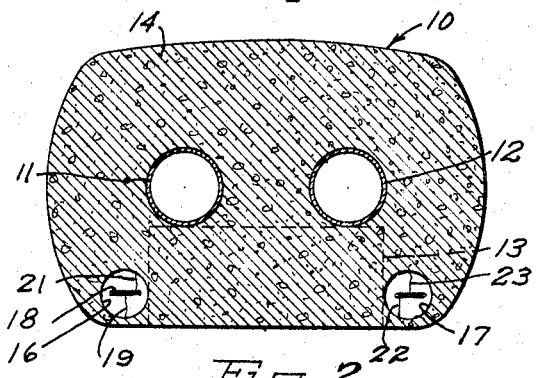
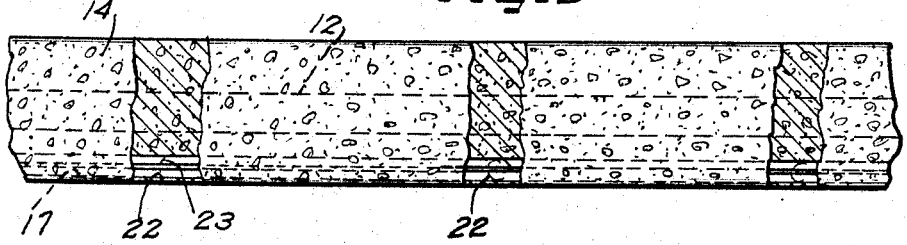
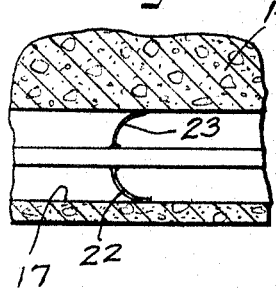
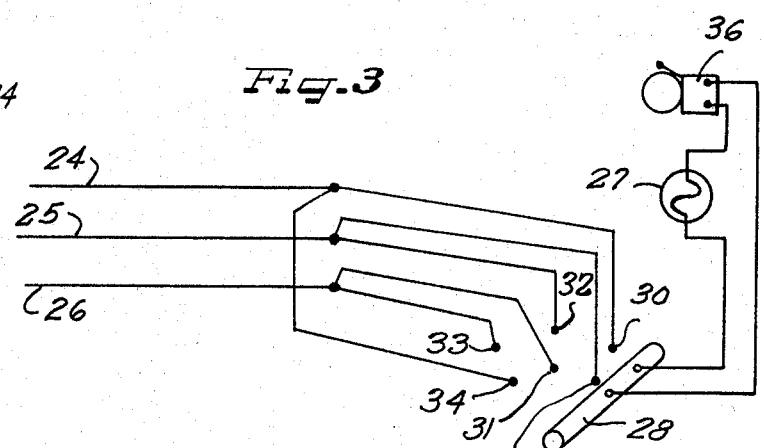
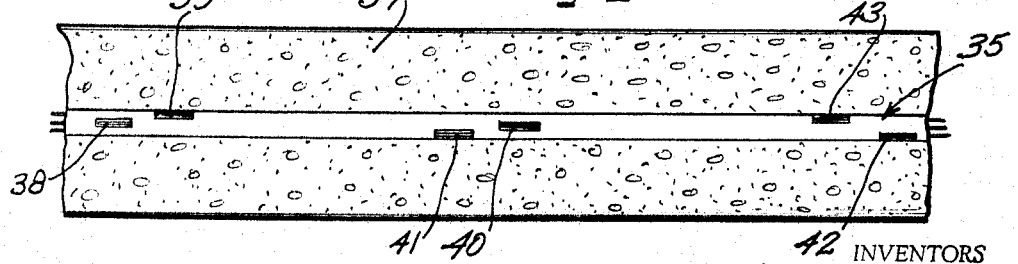
INVENTORS
Lincoln L. Loper, Jr.
BY George E. Ziegler
ATTORNEYS

United States Patent Office 3,382,493
Patented May 7, 1968

3,382,493
UNDERGROUND PIPE INSULATION LIQUID-DETECTOR
Lincoln L. Loper, Jr., Bellevue, Wash., and George E. Ziegler, Evanston, Ill., assignors to Thermal Conduits, Inc., a corporation of Washington
Filed Nov. 4, 1964, Ser. No. 408,793
8 Claims. (Cl. 340—244)

ABSTRACT OF THE DISCLOSURE

Method and apparatus for detecting excessive moisture concentration in a relatively porous thermal insulation concrete embedment including electrode probes positioned in spaced relation along the embedment, a potential source for applying an alternating potential across the probes, and a sensing means which detects changes in conductivity between the probes when the moisture concentration has become built up sufficiently in the embedment.

---

The present invention relates to a method and apparatus for the detection of excessive moisture concentration in pipe insulation systems.

It is not uncommon to find that an underground heat distribution system has developed heat losses approaching the heat generating capacity of the source through deterioration of the thermal insulation by moisture absorption. It becomes important, therefore, to be sure of the integrity of the impervious barrier between the thermal insulation and ground environment at all times, initially when installed and subsequently after years of operation. A typical criteria for checking the integrity of the thermal conduit at installation involves air testing the casing, either metallic or non-metallic, surrounding the insulation. A specified air pressure must be maintained for a designated length of time to prove tightness. However, such testing is not infalliable—slag inclusions, water soluble solids, fluxes or pin holes can be present, with no immediate leakage or so slight as to escape detection, but become appreciable sized holes by subsequent soltuion by water in service. The reverse action of water exposure creates or enlarges the paths for moisture penetration which then leads to progressive failure of the thermal conduit. The existence of appreciable moisture content in the insulation may also cause electrolytic corrosion of the pipe contained therein when the external impervious barrier is metallic or anaerobic corrosion of the pipe when the casing is non-metallic.

It is accordingly an object of the present invention to provide a system for detecting appreciable moisture concentration in an insulated thermal conduit for fluid carrying pipes.

Another object of the present invention is to provide a method of detecting appreciable moisture concentrations in insulated thermal conduits and for locating areas of excessive concentration conveniently.

Still another object of the invention is to provide a thermal insulation system for fluid carrying pipes with a moisture indicating system which is operable to detect seepage of moisture through the insulation as well as flooding of the insulation.

We have found that insulating concrete embedments containing Portland cement become appreciable electrical conductors when the moisture content reaches about 15% by weight. At a moisture content of 30 to 40%, the concrete forms a good electrolyte. In accordance with the present invention, we provide a method of detecting appreciable moisture concentration in a concrete embedment by positioning spaced electrodes in the embedment, applying a potential across the electrodes, and sensing changes in an electrical property of the embedment during the application of such potential. In one specific embodiment of the invention, the electrodes extend from along the length of a multi-conductor cable into contact with the surrounding embedment, and an alternating potential is applied sequentially between selected pairs of the electrodes to detect changes in conductivity existing in the portions of the embedment extending between the electrodes of the selected pair.

Lightweight calcium-silicate insulation, which is widely used in the insulation of underground insulated heat and cold distribution conduits also shows a significant change in electrical conductivity with change in moisture content. Other insulations such as fiber glass, 80% magnesia, granulated natural and synthetic gilsonite likewise exhibit changes in electrical conductivity. Portland cement insulation is used as an example in our description but the invention is not limited to this material.

A more complete description of the present invention will be made in conjunction with the attached sheet of drawings which illustrate several preferred embodiments:

In the drawings:

FIGURE 1 is a cross-sectional view of an embedment of the type to which the devices of the present invention are applicable;

FIGURE 2 is a side elevational view of the embedment shown in FIGURE 1, with portions thereof broken away to illustrate the construction more clearly;

FIGURE 3 is a somewhat schematic view of a switching arrangement and energizing circuit which may be employed for the purposes of the present invention;

FIGURE 4 is a side elevational view of an embedment showing a modified form of the present invention; and FIGURE 5 is an enlarged fragmentary view of a portion of FIGURE 2.

The embedment shown in FIGURE 1 has been indicated generally at reference numeral 10. It is designed to insulate one or more pipes 11 and 12 carrying liquid or gas. The pipes 11 and 12 are positioned on spaced support blocks 13 and are completely surrounded by a monolithic thermal insulating concrete embedment 14. For the insulating material, we prefer to use a lightweight, thermally insulated concrete composition made with Portland cement and a lightweight aggregate such as vermiculite, together with suitable integral waterproofing agents such as calcium stearate, powdered air floated pitch, or commercially available asphalt emulsion. A typical composition may be prepared by combining one bag of Portland cement weighing 94 lbs. with 8 cubic feet of expanded vermiculite having a particle size of —10 to +65 mesh, 7 quarts of an asphalt emulsion prepared by mixing approximately 55 parts by weight of 50–60 penetration asphalt from California petroleum with about 43.35 parts hot water containing substantially 0.15 part of caustic soda, and 26 gallons of water. The asphalt emulsion may be treated to convert the emulsion to the slow breaking mixing type by incorporating therein about 1.5 parts of a saponified "Vinsol" resin derived from the extraction of rosin with petroleum solvents.

The particular embedment illustrated in FIGURE 1 of the drawings makes use of vent passages 16 and 17 extending in parallel spaced relation to the pipes 11 and 12 throughout the entire length of the embedment. These vents provide for the removal of liquid and vaporous moisture within the insulating assembly, and are more fully described in Loper U.S. Patent No. 3,045,707 and Ziegler U.S. Patent No. 3,045,708, both issued on July 24, 1962.

The vents 16 and 17 form convenient means for locating the electrodes of the present invention.

As seen in FIGURES 1 and 2, the electrodes of the present invention may take the form of a flat ribbon multi-conductor cable 18, in the illustrated embodiment, consisting of three spaced electrical conductors separated by electrical insulation. Normally, a conductor will be used which has more than three wires in its since this gives a greater number of combinations of pairs of conductors in the sensing system. For example, in a three wire system, one can measure the electrode conductivity between electrodes extending from (1) the center conductor and one edge conductor (2) the center conductor and the other edge conductor and (3) the two edge conductors. With a four wire cable, 6 test points are provided, with a five wire cable there are ten test points, and so on. The invention is not limited to the flat arrangement illustrated, and in practice a twisted or extruded multi-conductor cable may be a preferred form.

The electrode elements in the illustrated form of the invention take the form of flexible feelers 19 and 21 which extend from the center conductor of the cable and one side edge conductor, as viewed in FIGURE 1. Similarly, feelers 22 and 23 may be conducted to the other edge conductor and the center conductor as shown in FIGURE 1. These feelers not only serve to provide electrical contact with the embedment, but also serve to mechanically position the multi-conductor cable in proper alignment within the vent passages 16 and 17. Phosphor bronze wire forms a suitable material from which the feelers can be made.

A typical energizing system for selectively measuring or sensing changes in electrical conductivity in the concrete embedment has been illustrated in FIGURE 3 of the drawings. Three conductors 24, 25 and 26 are arranged to be connected to the feelers extending from the three conductors of the three conductor cable illustrated in FIGURES 1 and 2. It should be evident that the feelers will be spaced by a predetermined distance, say 10 or 20 feet along the length of the embedment. The feelers are sequentially energized by a source of alternating current from an alternator 27. Direct current is not advisable for use in this type of system because of the polarization effects which could occur. Sixty cycle current or higher frequency current can be employed to advantage.

The alternating potential from the alternator 27 is applied across selected pairs of the electrode feelers through a switch indicated at reference numeral 28 in the drawings. This switch is arranged to bridge between a pair of contacts 29 and 30 thereby applying the alternating potential between conductors 24 and 25, and then bridge across a pair of contacts 31 and 32 which applies the potential between conductors 25 and 26. Finally, the switch arm 28 bridges a pair of contacts 33 and 34 to apply the alternating potential across the outer conductors 24 and 26.

The remainder of the circuit, in FIGURE 3, consists of an alarm device such as a bell 36 although it should be recognized that various audible or visual type indicators can be used. For example, the circuit may include a meter for measuring the exact amount of conductivity between the spaced electrodes. It may include a continuously recording device for providing a permanent record of the variations of conductivity. In this case, it is preferable to rotate the switch arm 28 at a constant angular velocity, in synchronism with the recording device.

The operation of the device shown in FIGURES 1 to 3 should be apparent from the foregoing description. When the operator measures the resistance between the electrodes of the selected pair, and finds it to be very high or near infinite, he can be assured that that particular section of the embedment does not provide the problem of moisture permeation. If, on the other hand, he finds that the resistance has substantially decreased, i.e., the conductivity between the electrodes has increased since the last measurement, then he knows that moisture permeation is present in the section between the two electrodes.

The modified form of the invention shown in FIGURE 4 provides a different location for the electrode structures. The structure illustrated in that drawing consists of an embedment 37 in which a ribbon type multi-conductor cable 35 is partly embedded in the side of the vent tube 17 or completely embedded in the body of the thermal insulating concrete embedment. Instead of providing feeler electrodes, the embodiment of FIGURE 4 provides pairs of electrodes by baring the conductors to provide exposed portions 38, 39, 40, 41, 42, 43 and 44, as illustrated. The multi-conductor cable may be supported in the form in which the monolithic embedment 37 is poured so that the setting of the concrete about the cable 35 causes the concrete to set about the cable 35 causes the concrete to set about the cable and lock it in position. The conductor wire cable may be led out at either end to a switching arrangement similar to that shown in FIGURE 3. The sensitivity of the moisture indicator can be increased by crimping or soldering on electrodes of extended area to the wires of the cable at the exposed wire points.

From the foregoing, it will be apparent that the system of the present invention provides a convenient means for locating and detecting the existence of harmful moisture concentrations in insulation embedments. The systems are sufficiently sensitive to detect the presence of moisture long before any catastrophic condition can occur. They are easy to install, and require substantially no maintenance.

It should be evident that various modifications can be made to the described embodiments without departing from the scope of the present invention.

We claim as our invention:

1. In a thermal insulation system in which a fluid carrying pipe is embedded in a relatively porous insulating concrete embedment, the improvement which comprises a plurality of electrodes engaging said embedment in spaced relation therealong, means for applying an alternating current potential across a pair of said electrodes, and means for detecting progressive changes in electrical resistivity between said pair of electrodes.

2. In a thermal insulation system in which is a fluid carrying pipe is embedded in a relatively porous insulating concrete embedment, the improvement which comprises a plurality of electrodes engaging said embedment in spaced relation therealong, means for applying an alternating current potential across a pair of said electrodes, and alarm means operable upon the establishment of significant electrical conductivity between said pair of electrodes.

3. In a thermal insulation system in which a fluid carrying pipe is embedded in a relatively porous insulating concrete embedment, the improvement which comprises a multi-conductor cable disposed within said embedment, feeler means extending from each of the conductors in said cable and contacting said embedment at spaced points therealong, means for applying an alternating potential across selected pairs of said feeler means, and means for sensing changes in electrical conductivity between said selected pairs.

4. In a thermal insulation system in which a fluid carrying pipe is embedded in a relatively porous insulating concrete embedment, the improvement which comprises a multi-conductor cable disposed within said embedment, feeler means extending from each of the conductors in said cable and contacting said embedment at spaced points therealong, switch means connected to said feeler means, an alternating current source connected to said switch means, said switch means being arranged to apply an alternating current potential across selected pairs of said feeler means, and indicating means in series with said source and said switch means for detecting a predetermined level of conductivity between said selected pairs.

5. In a thermal insulation system in which a fluid carrying pipe is embedded in a monolithic embedment including at least one vent passage therein in parallel spaced relationship to said pipe, the improvement which comprises a multi-conductor cable disposed in said vent passage, feeler means extending from each of the conductors in said cable into contact with the embedment, means for applying an alternating potential across selected pairs of said feeler means, and means for sensing changes in electrical conductivity between said selected pairs.

6. In a thermal insulation system in which a fluid carrying pipe is embedded in a monolithic embedment including at least one vent passage therein in parallel spaced relationship to said pipe, the improvement which comprises a multi-conductor cable disposed in said vent passage, feeler means extending from each of the conductors in said cable into contact with the embedment, switch means connected to said feeler means, an alternating current source connected to said switch means, said switch means being arranged to apply an alternating current potential across selected pairs of said feeler means, and indicating means in series with said source and said switch means for detecting a predetermined level of conductivity between said selected pairs.

7. In a thermal insulation system in which a fluid carrying pipe is embedded in a concrete embedment, the improvement which comprises a multi-conductor cable having parallel spaced conductors therein electrically insulated from each other, said cable being at least partially embedded in said embedment, the conductors in said cable being bared at spaced points along said cable, means for applying an alternating potential across selected pairs of the conductors, and means for sensing changes in electrical conductivity between said selected pairs.

8. In a thermal insulation system in which a fluid carrying pipe is embedded in a concrete embedment, the improvement which comprises a multiconductor cable having parallel spaced conductors therein electrically insulated from each other, said cable being at least partially embedded in said embedment, the conductors in said cable being bared at spaced points along said cable, switch means connected to said conductors, an alternating current source connected to said switch means, said switch means being arranged to apply an alternating current potential across selected pairs of said conductors, and indicating means in series with said source and said switch means for detecting a predetermined level of conductivity between said selected pairs.

References Cited

UNITED STATES PATENTS

| | | |
|---|---|---|
| 824,093 | 6/1906 | Dawes. |
| 1,648,197 | 11/1927 | Roodhouse. |
| 2,358,621 | 9/1944 | Buller et al. _____ 340—236 |
| 2,821,682 | 1/1958 | Bauer _____ 324—65 |
| 3,045,707 | 7/1962 | Loper _____ 138—106 |
| 3,045,708 | 7/1962 | Ziegler _____ 138—106 |
| 3,069,671 | 12/1962 | Taylor _____ 340—244 |
| 3,142,830 | 7/1964 | Patrick et al. _____ 340—244 X |

FOREIGN PATENTS 281,755    1/1931    Italy.

JOHN W. CALDWELL, *Primary Examiner.*

NEIL C. READ, *Examiner.*

D. MYER, *Assistant Examiner.*